US012073124B2

(12) United States Patent
Charles et al.

(10) Patent No.: US 12,073,124 B2
(45) Date of Patent: Aug. 27, 2024

(54) ARRAY RESOURCE BASED INPUT/OUTPUT (IO) PATH SELECTION IN A DISTRIBUTED SERVICES ENVIRONMENT

(71) Applicant: Dell Products L.P., Round Rock, TX (US)

(72) Inventors: Peniel Charles, Bangalore (IN); Owen Crowley, Carrigaline (IE); Venkata Adireddy Padala, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/974,917

(22) Filed: Oct. 27, 2022

(65) Prior Publication Data

US 2024/0143238 A1    May 2, 2024

(51) Int. Cl.
*G06F 3/06* (2006.01)
(52) U.S. Cl.
CPC .......... *G06F 3/0664* (2013.01); *G06F 3/0613* (2013.01); *G06F 3/0683* (2013.01)

(58) Field of Classification Search
CPC .... G06F 3/0613; G06F 3/0611; G06F 3/0664; G06F 3/0683; G06F 3/061; G06F 3/0689
See application file for complete search history.

(56) References Cited

U.S. PATENT DOCUMENTS

2015/0199136 A1*   7/2015   Faulkner ............... G06F 3/0689
                                                              711/114

* cited by examiner

*Primary Examiner* — Ernest Unelus
(74) *Attorney, Agent, or Firm* — Krishnendu Gupta; Nikhil Patel

(57) ABSTRACT

One or more aspects of the present disclosure relate to dynamically selecting a storage array and corresponding input/output (IO) paths between a host and the storage array. In embodiments, a virtual storage volume (VSV) can be established for a host entity using one or more storage device portions from a plurality of storage arrays. In addition, IO servicing metric parameters can be dynamically measured. For example, the servicing metric parameters can define metrics corresponding to the VSV's assigned ports on each storage array or network latency between the host and each storage array. Further, a primary storage array from the plurality of storage arrays can be selected based on the IO servicing metrics.

20 Claims, 6 Drawing Sheets

ARRAY RESOURCE BASED INPUT/OUTPUT (IO) PATH SELECTION IN A DISTRIBUTED SERVICES ENVIRONMENT

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

In aspects of the present disclosure, a method can include establishing a virtual storage volume (VSV) for a host entity using one or more storage device portions from a plurality of storage arrays, dynamically measuring input/output (IO) servicing metric parameters corresponding to the VSV's assigned ports on each of the storage arrays or network latency between the host and each of the plurality of storage arrays, and dynamically selecting a primary storage array from the plurality of storage arrays based on the IO servicing metrics.

In embodiments, the method can further include enabling each array of the plurality of storage arrays to process IO requests targeting the VSV.

In embodiments, the method can further include establishing a threshold for each parameter or a subset thereof.

In embodiments, the method can further include configuring a latency discovery signal to bypass IO queues of the plurality of storage arrays, In embodiments, the method can further include identifying real-time breaches of each threshold and issuing an update signal to the host entity, where the update signal informs the host of the real-time breaches.

In embodiments, the method can further include issuing the latency discovery signal over a network corresponding to the host entity and the plurality of storage arrays.

In embodiments, the method can further include receiving a response network signal with IO servicing metadata from each of the plurality of storage arrays, where the IO servicing metadata can include the metadata from the latency discovery signal and port metadata of the VSV's assigned ports from each of the plurality of storage arrays.

In embodiments, the method can further include analyzing the response network signal and determining the latency of network paths between the host entity and each storage array based on the analysis.

In embodiments, the method can further include generating an IO servicing score for each of the plurality of storage arrays using the IO servicing metadata. Further, using each IO servicing score, the method can include selecting the primary storage array based on the IO servicing score of each of the plurality of storage arrays or dynamically switching a current primary storage array to another storage array of the plurality of storage arrays.

In embodiments, the method can further include selecting the primary storage array or switching the primary storage array to the other storage array by changing each state of network paths between the host entity and the primary storage array or the other storage array to active and changing each state of network paths between the host entity and non-primary storage arrays of the plurality of storage arrays to standby.

In aspects of the present disclosure, a system, with a processor and memory, is configured to establish a virtual storage volume (VSV) for a host entity using one or more storage device portions from a plurality of storage arrays, dynamically measure input/output (IO) servicing metrics parameters corresponding to the VSV's assigned ports on each of the storage arrays or network latency between the host and each of the plurality of storage arrays, and dynamically select a primary storage array from the plurality of storage arrays based on the IO servicing metrics.

In embodiments, the system can be further configured to enable each array of the plurality of storage arrays to process IO requests targeting the VSV.

In embodiments, the system can be further configured to establish a threshold for each parameter or a subset thereof.

In embodiments, the system can be further configured to configure a latency discovery signal to bypass IO queues of the plurality of storage arrays, In embodiments, the system can be further configured to identify real-time breaches of each threshold and issue an update signal to the host entity, where the update signal informs the host of the real-time breaches.

In embodiments, the system can be further configured to issue the latency discovery signal over a network corresponding to the host entity and the plurality of storage arrays.

In embodiments, the system can be further configured to receive a response network signal with IO servicing metadata from each of the plurality of storage arrays, where the IO servicing metadata can include the metadata from the latency discovery signal and port metadata of the VSV's assigned ports from each of the plurality of storage arrays.

In embodiments, the system can be further configured to analyze the response network signal and determine the latency of network paths between the host entity and each storage array based on the analysis.

In embodiments, the system can be further configured to generate an IO servicing score for each of the plurality of storage arrays using the IO servicing metadata. Further, using each IO service score, the system can be configured to select the primary storage array based on the IO servicing score of each of the plurality of storage arrays or dynamically switch a current primary storage array to another storage array of the plurality of storage arrays.

In embodiments, the system can be further configured to select the primary storage array or switch the primary storage array to the other storage array by changing each state of network paths between the host entity and the primary storage array or the other storage array to active, and change each state of network paths between the host entity and non-primary storage arrays of the plurality of storage arrays to standby.

Other technical features are readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts

DETAILED DESCRIPTION

A business like a financial or technology corporation can produce large amounts of data and require sharing access to that data among several employees. These companies often use storage arrays to store and manage the data. Because a business can configure a storage array with multiple storage devices (e.g., hard-disk drives (HDDs) or solid-state drives (SSDs)), a company can scale (e.g., increase or decrease) and manage an array's storage capacity more efficiently compared to a server. In addition, a company can use a storage array to read/write data required by one or more business applications.

Occasionally, a business can establish a storage array cluster that delivers storage services, including two or more storage arrays. Further, the business's host machine can use multi-pathing techniques that select a primary storage array from the array cluster to provide storage services. Unfortunately, current naïve approaches only select the primary storage array based on the latency between the host machine and each array cluster's storage arrays. Thus, the current naïve approaches experience significant performance degradation when the primary storage array experiences high utilization.

Accordingly, embodiments of the present disclosure include dynamically selecting a primary storage array from an array cluster as a function of network latencies and each storage array's utilization and load, as described in greater detail herein.

Figure 1:
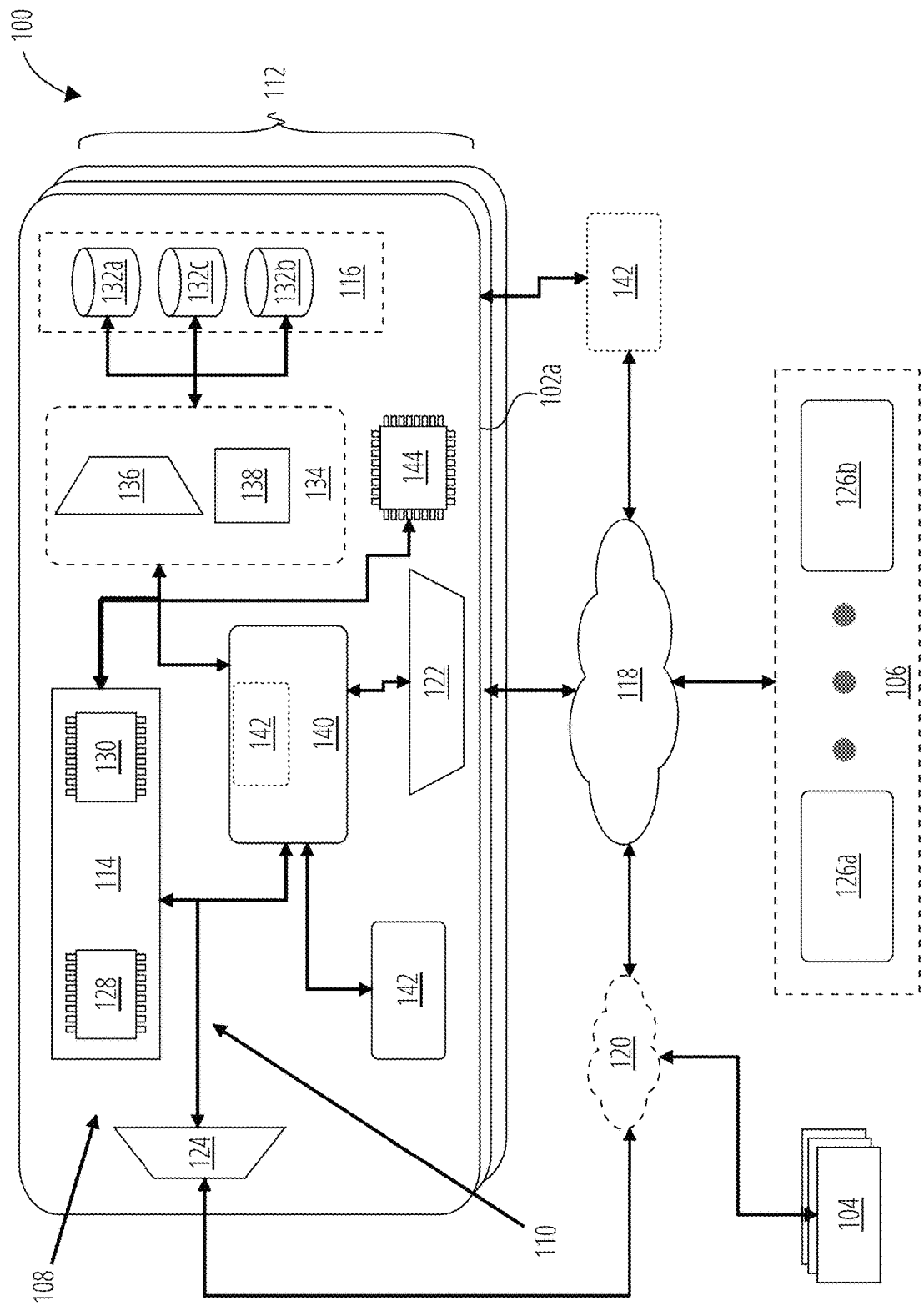
FIG. 1 shows a distributed network environment in accordance with embodiments of the present disclosure.

Regarding FIG. 1, a distributed network environment 100 can include a storage array 102a, a remote system 104, and hosts 106. In embodiments, the storage array 102a can include components 108 that perform one or more distributed file storage services. In addition, the storage array 102a can include one or more internal communication channels 110 like Fibre channels, busses, and communication modules that communicatively couple the components 108. Further, the distributed network environment 100 can define an array cluster 112 that can include two or more storage arrays, including the storage array 102a.

In embodiments, the storage array 102a, components 108, and remote system 104 can include a variety of proprietary or commercially available single or multiprocessor systems (e.g., parallel processor systems). Single or multiprocessor systems can include central processing units (CPUs), graphical processing units (GPUs), and the like. Additionally, the storage array 102a, remote system 104, and hosts 106 can virtualize one or more of their respective physical computing resources (e.g., processors (not shown), memory 114, and persistent storage 116).

In embodiments, the storage array 102a and, e.g., one or more hosts 106 (e.g., networked devices) can establish a network 118. Similarly, the storage array 102a and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), and Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102a can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102a to the network 118 (e.g., SAN). Further, the HA 122 can receive and direct IOs to one or more of the storage array's components 108, as described in greater detail herein.

Likewise, a remote adapter (RA 124) can connect the storage array 102a to the remote network 120. Further, the network 118 and remote network 120 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-b, running one or more applications. The applications can require one or more of the storage array's services. Accordingly, each application can send one or more input/output (IO) messages (e.g., a read/write request or other storage service-related request) to the storage array 102a over the network 118. Further, the IO messages can include metadata defining performance requirements according to a service level agreement (SLA) between hosts 106 and the storage array provider.

In embodiments, the storage array 102a can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 132 can execute to perform one or more storage-related services. For example, the storage array 102a can have a multiprocessor architecture that can include one or more CPUs (central processing units) and GPUs (graphical processing units).

In addition, the storage array 102a can deliver its distributed storage services using persistent storage 116. For example, the persistent storage 116 can include multiple thin-data devices (TDATs) such as persistent storage drives 132a-c. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102a can include a device interface (DI 134) that manages access to the array's persistent storage 116. For example, the DI 134 can include a device adapter (DA 136) (e.g., storage device controller), flash drive interface 138, and the like that controls access to the array's persistent storage 116 (e.g., storage devices 128a-c).

Likewise, the storage array 102a can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-b) remote/distributed storage services by virtualizing the storage array's memory/storage resources (memory 114 and persistent storage 116, respectively).

In embodiments, the storage array 102a can also include a controller 142 (e.g., management system controller) that can reside externally from or within the storage array 102a and one or more of its components 108. When external from the storage array 102a, the controller 142 can communicate with the storage array 102a using any known communication connections. The communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, computing, storage, and memory resources as described in greater detail herein.

Figure 2:
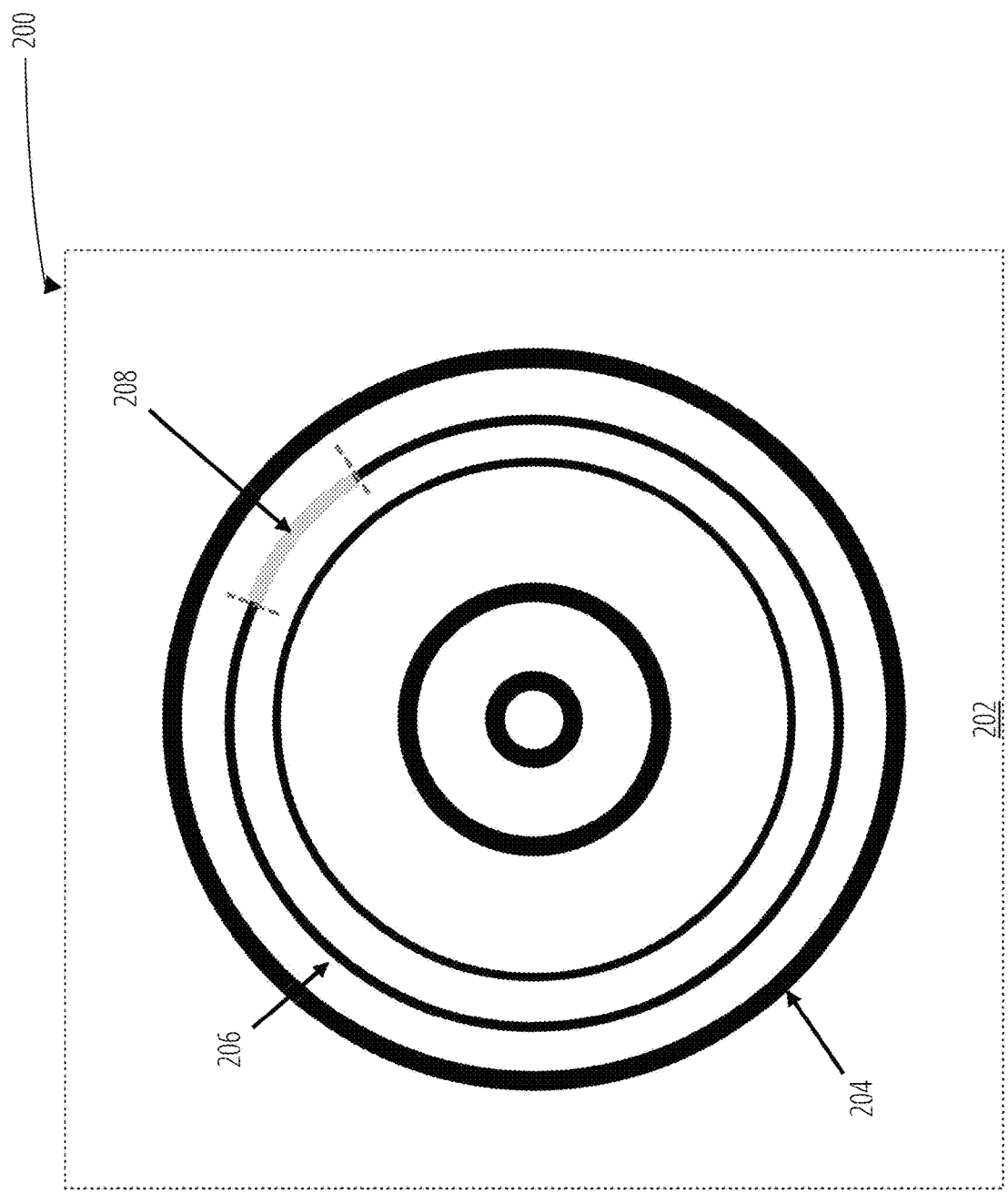
FIG. 2 is a cross-sectional view of a storage device in accordance with embodiments of the present disclosure.

Regarding FIG. 2, the storage array's EDS 140 can virtualize the array's persistent storage 116. Specifically, the EDS 140 can virtualize a storage device 200, which is substantially like one or more of the storage devices 132a-132b. For example, the EDS 140 can provide a host, e.g., client machine 126a, with a virtual storage device (e.g., thin-device (TDEV)) that logically represents one or more of the storage array's physical storage resources or slices/portions thereof (e.g., extents). Further, the EDS 140 can provide each TDEV with a unique identifier (ID) like a target ID (TID). Additionally, EDS 140 can map each TID to its corresponding TDEV using a logical unit number (LUN) (e.g., a pointer to the TDEV). The EDS 140 can also generate a searchable data structure, mapping logical storage representations to their corresponding physical address spaces. Thus, EDS 100 can enable the HA 122 to present the hosts 106 with logical storage representations based on host or application performance requirements.

For example, the persistent storage 116 can include an HDD 202 with stacks of cylinders 204. Like a vinyl record's grooves, each cylinder 204 can include one or more tracks 206. Each track 206 can include continuous sets of physical address spaces representing each of its sectors 208 (e.g., slices or portions thereof). The EDS 140 can provide each slice/portion with a corresponding logical block address (LBA). Additionally, the EDS 140 can group sets of continuous LBAs to establish one or more extents. Further, the EDS 140 can group a set of extents to establish a virtual storage device (e.g., TDEV). Thus, each TDEV can include extents and LBAs corresponding to one or more of the persistent storage 116 or portions thereof (e.g., tracks and address spaces).

As stated herein, the persistent storage 116 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 140 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102a can allocate the array's memory/storage resources based on an IO workload's anticipated volume of IO messages associated with each SL tier and the memory hierarchy.

For example, the EDS 140 can establish the hierarchy to include one or more tiers (e.g., subsets of the array's storage and memory) with similar performance capabilities (e.g., response times and uptimes). Thus, the EDS 140 can establish fast memory and storage tiers to service host-identified critical and valuable data (e.g., Platinum, Diamond, and Gold SLs). In contrast, slow memory and storage tiers can service host-identified non-critical and less valuable data (e.g., Silver and Bronze SLs). Additionally, the EDS 140 can define "fast" and "slow" performance metrics based on relative performance measurements of the array's memory 114 and persistent storage 116. Thus, the fast tiers can include memory 114 and persistent storage 116, with relative performance capabilities exceeding a first threshold. In contrast, slower tiers can include memory 114 and persistent storage 116, with relative performance capabilities falling below a second threshold. In embodiments, the first and second thresholds can correspond to the same threshold.

Figure 3:
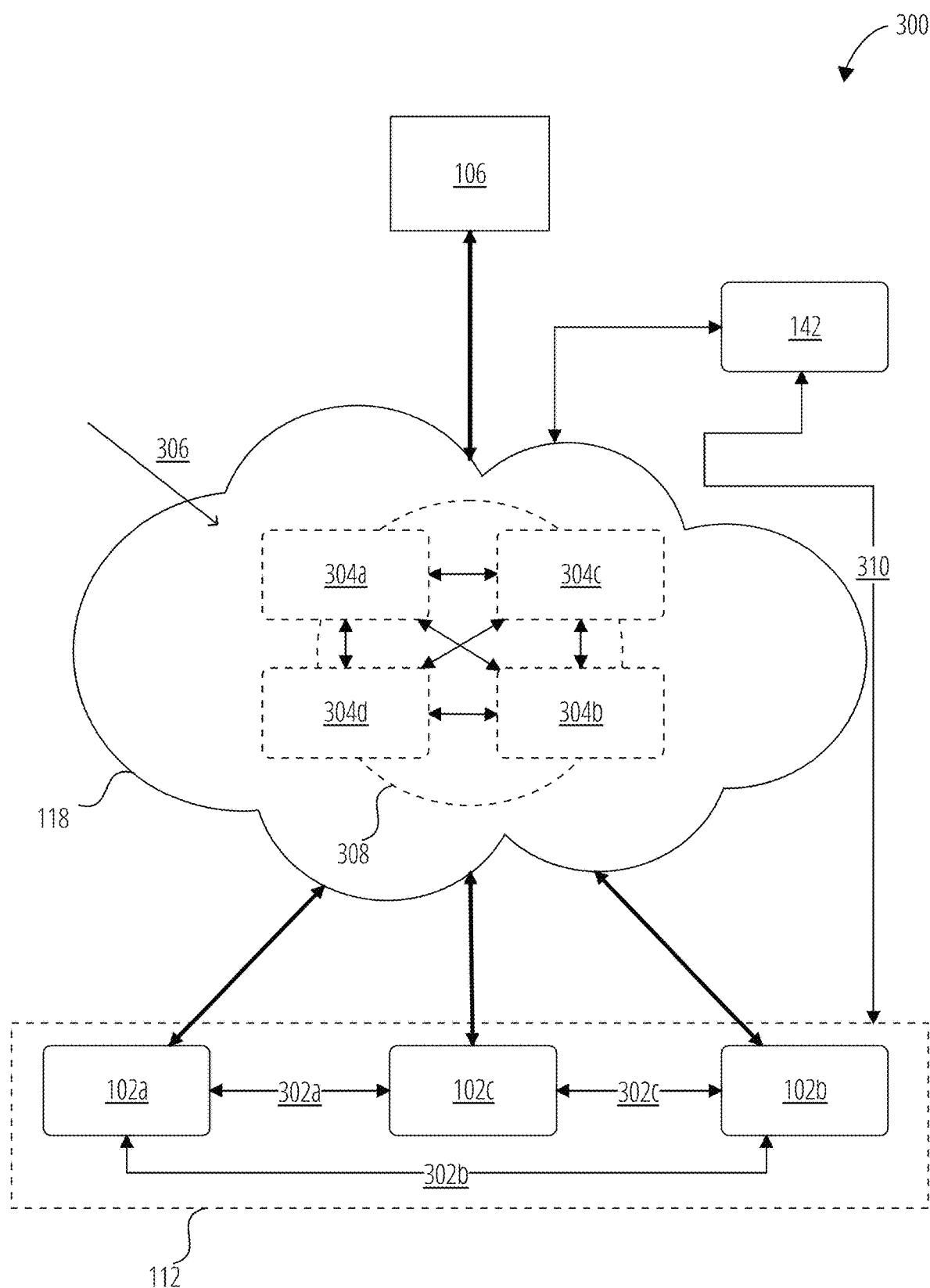
FIG. 3 shows a multipath distributed network environment in accordance with one embodiment.

Regarding FIG. 3, a distributed network environment 300 can include an array cluster 112. In embodiments, the array cluster 112 can include two or more storage arrays (e.g., storage arrays 102a-102b). Further, each array of the array cluster 112 can have an architecture that is substantially similar to the storage array 102a of FIG. 1. In addition, the storage arrays 102a-102b are configured to share and present one or more of the same virtual storage volumes (e.g., a stretched volume) to a host 106. Accordingly, the storage arrays 102a-102b can maintain a current and updated status of each stretched volume using remote data facility links (e.g., RDF link 302a-302b). For example, the RDF links 302a-302b define a protocol that enables the storage arrays to synchronize information. Thus, e.g., if storage array 102a receives IO requests changing a stretched volume, it can provide the changes or the IO requests to storage arrays 102c-102b via the RDF links 302a-302b.

In embodiments, the distributed network environment 300 can include a SAN 118 that communicatively couples networked devices (e.g., the array cluster 112, a host 106, and controller 142). For example, the SAN 118 can include nodes (e.g., network nodes 304a-304b) having a layout defining a network architecture 306. For example, the network architecture 306 can establish information flows between devices (e.g., the array cluster 112, host 106, and controller 142) connected to the SAN 118 (e.g., networked devices). Specifically, the network architecture 306 can provide multiple communication paths between the networked devices.

Further, the SAN 118 can include network node links 308 interconnecting the nodes. The network node links 308 allow the nodes to exchange messages using one or more communication protocols. The communication protocols define techniques (e.g., rules, syntax, semantics, and the like) by which the nodes and networked devices can pass messages between themselves. Additionally, the nodes can include networking hardware such as computing nodes (e.g., computers), servers, networking hardware, bridges, switches, hubs, and the like.

In embodiments, a controller 142 can issue an admin signal over the SAN 118 or the direct link 310 to each array connected to the SAN 118. Additionally, the controller 142 analyzes responses to the admin signal to identify the array cluster 112 as having at least one stretched volume shared between the storage arrays 102a-102b. Further, the controller 142 can determine that the stretched volume corresponds to a virtual storage volume presented to the host 106 using, e.g., the stretched volume's LUN to search a LUN-to-host data mapping structure in its memory 402. Specifically, the controller 142 can maintain and update the LUN-to-host data mapping structure using metadata from the admin signal response.

Upon identifying the host 106, the controller 142 can discover network paths between the storage arrays 102a-102b and the host 106 using network path discovery signals. For example, the controller 142 can issue or instruct the storage arrays 102a-102b to issue network path discovery signals to the host 106. The network path discovery signals can traverse the SAN 118 and maintain a travel log, identifying the network node links 308 and network nodes encountered while traveling to the host 106. Further, the host 106 can deliver a discovery response signal upon receiving the network path discovery signals. In addition to their respective travel logs, each network path discovery signal can include a return network address and return path instructions the host 106 uses to generate a response. Thus, the controller 142 can use the travel logs to determine the network paths between the storage arrays 102a-102b, respectively, and the host 106. In addition, the controller 142 can determine, in real-time or on-demand, the respective latencies of the network paths upon identifying the paths between the arrays of the array cluster 112.

In embodiments, the controller 142 can determine load and utilization states of the storage arrays 102a-102b via, e.g., load signals received from the array cluster 112. Further, the controller 142 can dynamically establish one of the storage arrays 102a-102b as the host's primary storage services provider. For example, the controller 142 can determine real-time latency, load, and utilization metrics using the latency discovery and load signals. Upon establishing the primary storage service provider, the controller 142 can transmit a services provisioning signal to the storage arrays 102a-102b and the host 106 with instructions for providing and using storage array services corresponding to the stretched volume described in greater detail by FIG. 6 below.

Figure 4:
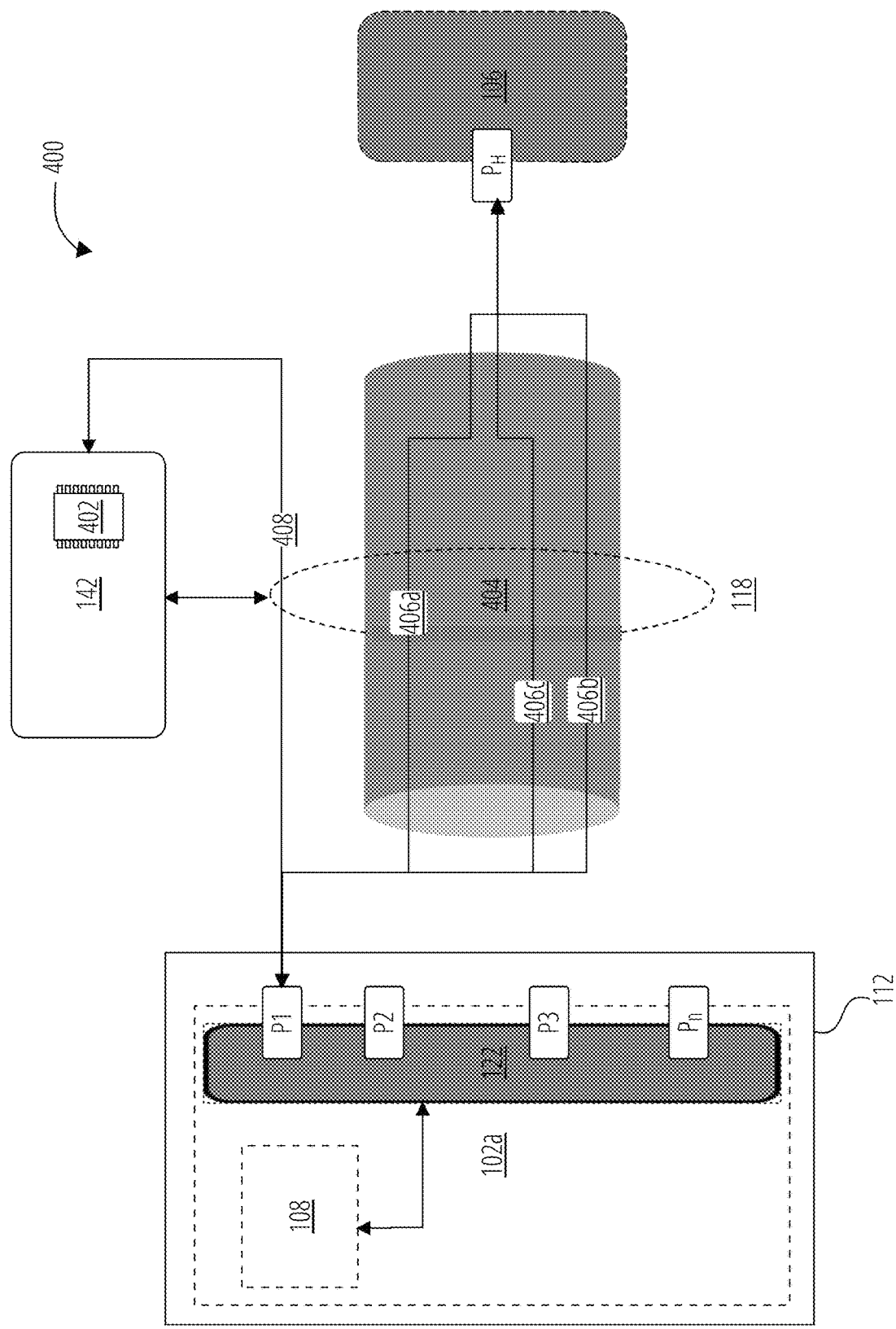
FIG. 4 shows network paths between a host and an array in a multipath-distributed network environment in accordance with embodiments of the present disclosure.

Regarding FIG. 4, a distributed network environment 400 can include an array cluster 112 communicatively coupled to a host 106 via a SAN 118. In embodiments, the distributed network environment 400 can include a controller 142 coupled to the SAN 118. Further, the controller 142 can dynamically select a primary storage services provider (e.g., an array from the array cluster 112) to deliver the host 106 storage services.

In embodiments, the array cluster 112 can include a storage array 102a having an HA 122 with network ports $P_{1-n}$, the controller 142 can identify network paths 404 between the storage array 102a and the host 106. Additionally, as described above, the controller 142 can identify network paths 404 between the storage array 102a and the host 106 using network path discovery signals and their corresponding discovery response signals. Specifically, the controller 142 includes a port-to-port paths data array in its memory that stores the network paths 404 identified from discovery response signals corresponding to network path discovery signals, defining a source network address as network port $P_1$ and a destination address as host network port $P_H$. For example, the controller 142 can analyze travel logs from the discovery response signals to identify distinct network paths 406a-406b between storage array port $P_1$ and host port $P_H$. Likewise, the controller 142 can identify network paths between at least one port of the array cluster's other storage arrays and the host port $P_H$.

In embodiments, the controller 142 can dynamically determine the latency corresponding to respective network paths 406a-406b between network port $P_1$ and host port $P_H$ of the storage array 102a. Likewise, the controller 142 can determine port-to-port latencies corresponding to the port-to-port paths of the array cluster's other storage arrays. Specifically, the controller 142 can send a command signal (e.g., command signal 408) to the storage arrays 102a-102b, instructing them to transmit latency discovery signals over their corresponding port-to-port network paths (e.g., network paths 406a-406b).

Suppose, for example, the controller 142 issues a command signal 408 to storage array 102a via HA port $P_1$. Further, suppose the HA port $P_1$ is actively receiving an IO workload from a host entity (e.g., client machine 126a of FIG. 1). Given that network latency information can inherently become stale (e.g., outdated), the controller 142 can configure the command signal 408 with an IO queue bypass key. The IO queue bypass key allows the command signal 408 to essentially "skip the line," allowing the storage array 102a to deliver network path latency metrics at near real-time speeds.

In embodiments, the controller 142 can also determine load or utilization metrics of the storage arrays 102a-102b. For example, the controller 142 can establish at least one threshold corresponding to the load or utilization metrics. Further, the controller 142 can establish at least one unique threshold for the storage arrays 102a-102b. For instance, the controller 142 can include, in its memory 402, information corresponding to the respective configurations and anticipated IO workloads of the storage arrays 102a-102b. Accordingly, the controller 142 can use the information and SL information to establish each storage array's corresponding threshold. Thus, the thresholds can define load or utilization levels that, if crossed, can result in storage array response times that do not satisfy an SLA of the host 106.

Accordingly, the controller 142 can use the thresholds to establish a notifications subscriptions with the storage arrays 102a-102b using their corresponding thresholds. Thus, the storage arrays 102a-102b can alert the controller 142 of load or utilization levels as a function of their respective thresholds. For example, the controller 142 can establish a notifications subscription with the storage array 102a that provides the controller 142 with dynamic load or utilization metrics corresponding to storage array network port $P_1$.

The following text can include details of one or more methods or flow diagrams per embodiments of this disclosure. For simplicity of explanation, each method is depicted and described as a sequence of operations. However, each sequence can be altered without departing from the scope of the present disclosure. Additionally, one or more of each sequence's operations can be performed in parallel, concurrently, or a different sequence. Further, not all illustrated operations are required to implement each method described by this disclosure.

Figure 5:
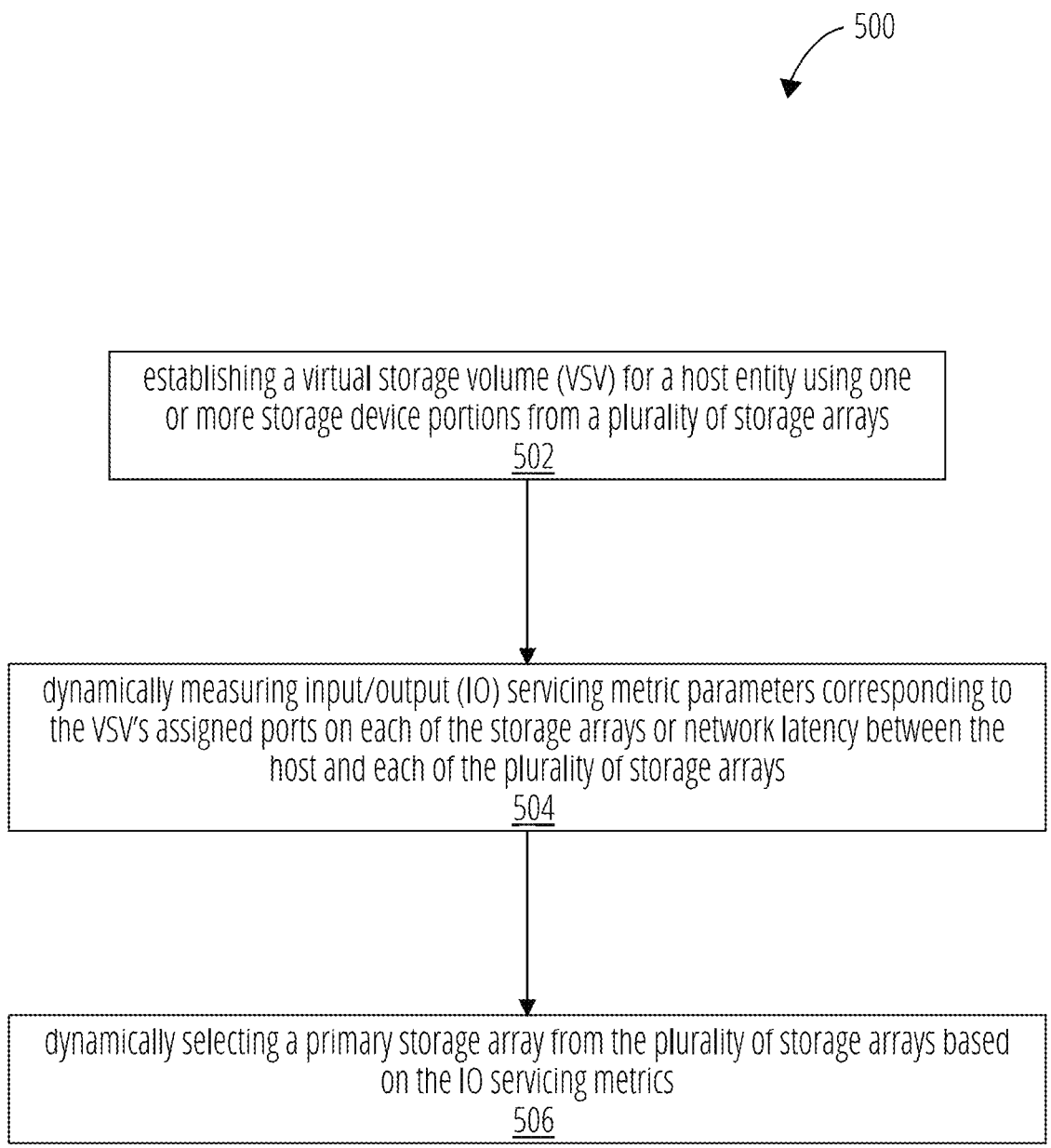
FIG. 5 is a flow diagram of a method for dynamically selecting a storage array in an array cluster in accordance with embodiments of the present disclosure.

Regarding FIG. 5, a method 500 can include a set of alterable operations for dynamically selecting a storage array in an array cluster having a common stretch virtual storage volume. In embodiments, the method 500, at 502, can include establishing a virtual storage volume (VSV) for a host entity using one or more storage device portions from a plurality of storage arrays. For example, the controller 142 of FIG. 1 can establish a virtual storage volume (VSV) for a host entity using one or more storage device portions from a plurality of storage arrays.

In addition, the method 500, at 504, can include dynamically measuring input/output (IO) servicing metric parameters corresponding to the VSV's assigned ports on each storage array or network latency between the host and each storage array. For example, the controller 142 of FIG. 1 can dynamically measure input/output (IO) servicing metric parameters corresponding to the VSV's assigned ports on each storage array or network latency between the host and each of the plurality of storage arrays. Further, the method 500, at 506, can include dynamically selecting a primary storage array from the plurality of storage arrays based on the IO servicing metrics. For example, the controller 142 of FIG. 1 can dynamically select a primary storage array from the plurality of storage arrays based on the IO servicing metrics).

Figure 6:
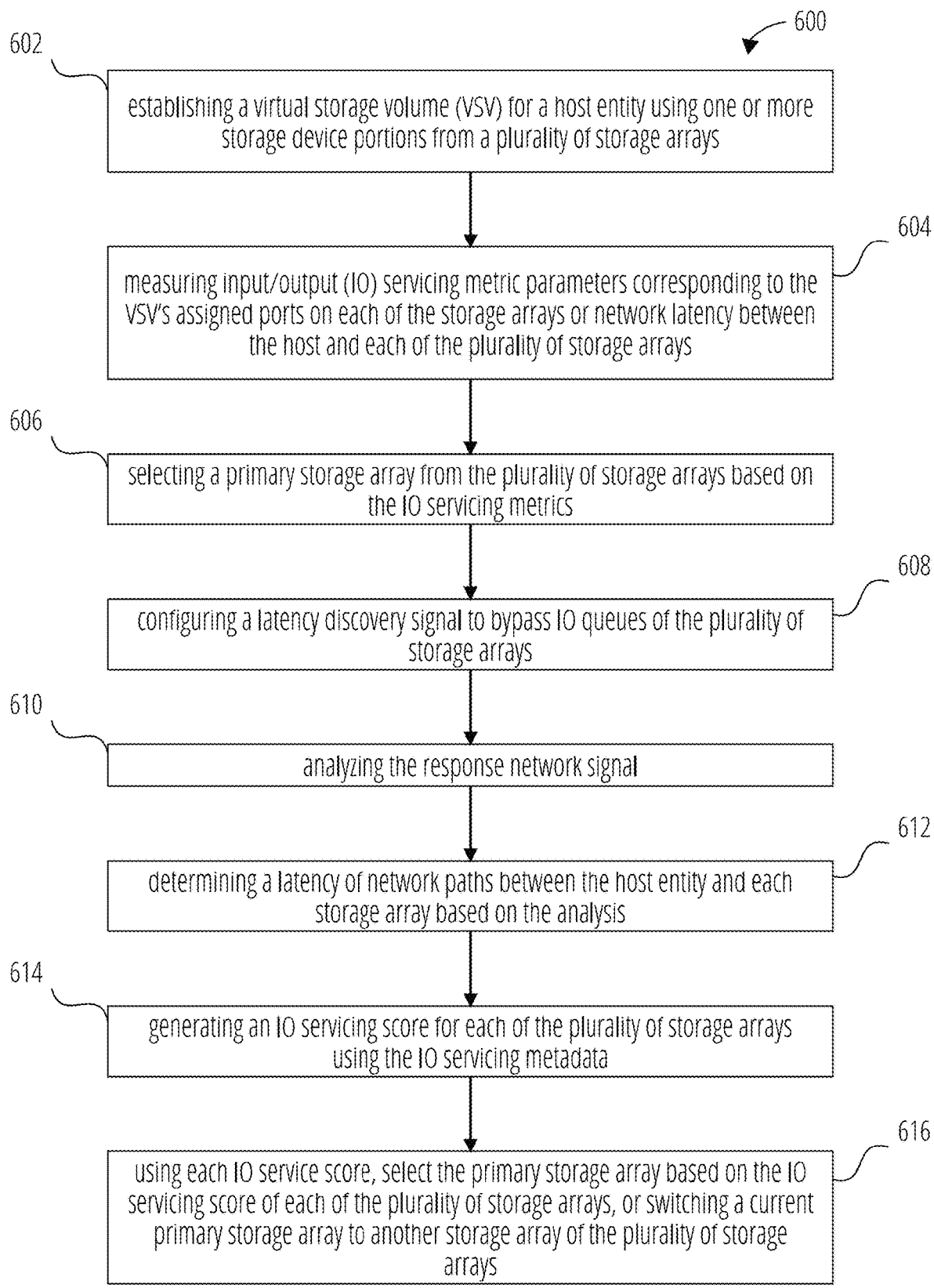
FIG. 6 is another flow diagram of a method for dynamically selecting a storage array in an array cluster in accordance with embodiments of the present disclosure.

Regarding FIG. 6, a method 600 can include a set of alterable operations for dynamically selecting a storage array in an array cluster having a common stretch virtual storage volume. In embodiments, the method 600 can include establishing a virtual storage volume (VSV) for a host entity using one or more storage device portions from a plurality of storage arrays at 602. For example, the controller 142 of FIG. 1 can establish a virtual storage volume (VSV) for a host entity using one or more storage device portions from a plurality of storage arrays. Additionally, the method 600 can include measuring input/output (IO) servicing metric parameters corresponding to the VSV's assigned ports on each storage array or network latency between the host and each of the plurality of storage arrays at 604. For example, the controller 142 of FIG. 1 can measure input/output (IO) servicing metric parameters corresponding to the VSV's assigned ports on each of the storage arrays or network latency between the host and each of the plurality of storage arrays. Further, the method 600 can include selecting a primary storage array from the plurality of storage arrays based on the IO servicing metrics at 606. For example, the controller 142 of FIG. 1 can select a primary storage array from the plurality of storage arrays based on the IO servicing metrics.

In embodiments, the method 600 can include configuring a latency discovery signal to bypass IO queues of the plurality of storage arrays at 608. For example, the controller 142 of FIG. 1 can configure a latency discovery signal to bypass IO queues of the plurality of storage arrays. Additionally, the method 600 can include analyzing the response network signal at 610. For example, the controller 142 of FIG. 1 can analyze the response network signal. Further, the method 600 can include determining a latency of network paths between the host entity and each storage array based on the analysis at 612. For example, the controller 142 of FIG. 1 can determine a latency of network paths between the host entity and each storage array based on the analysis.

In embodiments, the method 600 can include generating an IO servicing score for each of the plurality of storage arrays using the IO servicing metadata at 614. For example, the controller 142 of FIG. 1 can generate an IO servicing score for each of the plurality of storage arrays using the IO servicing metadata. Further, the method 600, at 616, can include selecting the primary storage array based on the IO servicing score of each of the plurality of storage arrays using each IO service score or switching a current primary storage array to another storage array of the plurality of storage arrays using each IO service score. For example, the controller 142 of FIG. 1, using each IO service score, can select the primary storage array based on the IO servicing score of each storage array or switch a current primary storage array to another storage array of the plurality of storage arrays.

Further, each operation of the methods described above can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer having a display device that enables user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
  establishing, via a controller, a virtual storage volume (VSV) for a host entity using one or more storage device portions from a plurality of storage arrays logically grouped into an array cluster, wherein the VSV is established as a stretched volume having data copies on each storage array of the plurality of storage arrays, wherein each stretched volume is associated with a corresponding VSV shared and presented by each storage array in the array cluster and wherein each storage array in the array cluster synchronizes data and information of each stretched volume using at least one remote data facility (RDF) link;
  dynamically measuring input/output (IO) servicing metric parameters, via the controller, corresponding to the VSV's assigned ports on each storage array of the plurality of storage arrays and network latency between the host and each of the plurality of storage arrays, wherein the servicing metric parameters correspond to latency, load and utilization corresponding to each port of each storage array, and wherein each port corresponds to a network interface port of each storage array with each network interface port having a unique network address, wherein the network latency is distinct from the latency corresponding to the IO servicing metric parameters; and
  dynamically selecting a primary storage array from the plurality of storage arrays based on the IO servicing metric parameters and the network latency via the controller, wherein the selected primary storage array is a subset of the plurality of storage arrays.

2. The method of claim 1, further comprising:
  enabling each array of the plurality of storage arrays to process IO requests targeting the VSV.

3. The method of claim 1, further comprising:
  establishing a threshold for each parameter or a subset thereof.

4. The method of claim 3, further comprising:
  identifying real-time breaches of each threshold; and
  issuing an update signal to the host entity, wherein the update signal informs the host of the real-time breaches.

5. The method of claim 1, further comprising:
  configuring a latency discovery signal to bypass IO queues of the plurality of storage arrays.

6. The method of claim 5, further comprising:
issuing the latency discovery signal over a network corresponding to the host entity and the plurality of storage arrays.

7. The method of claim 6, further comprising:
receiving a response network signal with IO servicing metadata from each of the plurality of storage arrays, wherein the IO servicing metadata includes the metadata from the latency discovery signal and port metadata of the VSV's assigned ports from each of the plurality of storage arrays.

8. The method of claim 5, further comprising:
analyzing the response network signal; and
determining a latency of network paths between the host entity and each storage array based on the analysis.

9. The method of claim 8, further comprising:
generating an IO servicing score for each of the plurality of storage arrays using the IO servicing metadata; and
using each IO servicing score:
 selecting the primary storage array based on the IO servicing score of each of the plurality of storage arrays, or
 dynamically switching a current primary storage array to another storage array of the plurality of storage arrays.

10. The method of claim 9, further comprising:
selecting the primary storage array or switching the primary storage array to the other storage array by:
 changing each state of network paths between the host entity and the primary storage array or the other storage array to active, and
 changing each state of network paths between the host entity and non-primary storage arrays of the plurality of storage arrays to standby.

11. A system with a processor and memory, the system configured to:
establish, via a controller, a virtual storage volume (VSV) for a host entity using one or more storage device portions from a plurality of storage arrays logically grouped into an array cluster, wherein the VSV is established as a stretched volume having data copies on each storage array of the plurality of storage arrays, wherein each stretched volume is associated with a corresponding VSV shared and presented by each storage array in the array cluster;
dynamically measure input/output (IO) servicing metric parameters, via the controller, corresponding to the VSV's assigned ports on each storage array of the plurality of storage arrays and network latency between the host and each of the plurality of storage arrays, wherein the servicing metric parameters correspond to latency, load and utilization corresponding to each port of each storage array, and wherein each port corresponds to a network interface port of each storage array with each network interface port having a unique network address, wherein the network latency is distinct from the latency corresponding to the IO servicing metric parameters; and
dynamically select a primary storage array from the plurality of storage arrays based on the IO servicing metric parameters and the network latency via the controller, wherein the selected primary storage array is a subset of the plurality of storage arrays.

12. The system of claim 11, further configured to:
enable each array of the plurality of storage arrays to process IO requests targeting the VSV.

13. The system of claim 11, further configured to:
establish a threshold for each parameter or a subset thereof.

14. The system of claim 13, further configured to:
identify real-time breaches of each threshold; and
issue an update signal to the host entity, wherein the update signal informs the host of the real-time breaches.

15. The system of claim 11, further configured to:
configure a latency discovery signal to bypass IO queues of the plurality of storage arrays.

16. The system of claim 15, further configured to:
issue the latency discovery signal over a network corresponding to the host entity and the plurality of storage arrays.

17. The system of claim 16, further configured to:
receive a response network signal with IO servicing metadata from each of the plurality of storage arrays, wherein the IO servicing metadata includes the metadata from the latency discovery signal and port metadata of the VSV's assigned ports from each of the plurality of storage arrays.

18. The system of claim 15, further configured to:
analyze the response network signal; and
determine a latency of network paths between the host entity and each storage array based on the analysis.

19. The system of claim 18, further configured to:
generate an IO servicing score for each of the plurality of storage arrays using the IO servicing metadata; and
using each IO service score:
 select the primary storage array based on the IO servicing score of each of the plurality of storage arrays, or
 dynamically switch a current primary storage array to another storage array of the plurality of storage arrays.

20. The system of claim 19, further configured to:
select the primary storage array or switching the primary storage array to the other storage array by:
 changing each state of network paths between the host entity and the primary storage array or the other storage array to active, and
 changing each state of network paths between the host entity and non-primary storage arrays of the plurality of storage arrays to standby.

* * * * *